Patented Nov. 13, 1945

2,388,984

UNITED STATES PATENT OFFICE 2,388,984

POLYISOBUTYLENE-WAX COMPOSITIONS

Gerry P. Mack, Jackson Heights, Long Island, N. Y., assignor to Advance Solvents & Chemical Corporation, New York, N. Y., a corporation of New York No Drawing. Application August 9, 1941, Serial No. 406,185

4 Claims. (Cl. 260—4)

This invention relates to film-forming or coating compositions, to a method of preparing the same and to the films derived therefrom.

It has been suggested in the past that self-sustaining films or coating compositions can be obtained from mixtures of rubbery materials and paraffin wax by dissolving such mixtures in solvents or by dissolving the rubbery material in paraffin wax and applying this melt at sufficiently high temperatures. Sheets coated with such compositions and films derived therefrom have been recommended for use as wrapping papers and the like. Self-sustaining films of these compositions have been suggested for use as heat-sealing adhesives and the like. The art has pointed out, however, that coatings and films of the desired freedom from tack at normal temperatures and heat sealing properties at elevated temperature, tensile strength, flexibility and the like can only be produced from these compositions when they have a high viscosity. Thus in U. S. P. 2,054,112 only those compositions of rubber and paraffin wax which have a viscosity of not less than 8,000 sec. on a Scott viscosimeter are said to be capable of yielding satisfactory coatings and films. I have found from experience moreover that even such an adjustment of the viscosity does not lead to commercially practical compositions if the rubber in such compositions is replaced by rubbery polymers of iso-olefines, such as of isobutylene. In this case the films are low in tensile strength, block easily, etc.

I have now found that coatings and films possessing far better strength, heat-sealing and freedom from tack properties than those of the prior art can be produced from compositions of non-tacky rubbery polymers of iso-olefines, i. e. those having a molecular weight ranging upward from 30,000, with or without, but preferably with an addition of paraffin wax, and without any such regulation of the viscosity as is required by the prior art, providing that there be included in the compositions an amorphous micro-crystalline petroleum wax of the type described in U. S. Patent 2,187,734 from page 2, left column, line 38, to page 2 right column, line 58. The particular effect which this amorphous micro-crystalline wax has on the polymer and on the paraffin wax when present and which leads to the attainment of the desired result is not known and cannot be ascertained. The effect, whatever it is, however, rather surprisingly is specific to said amorphous micro-crystalline wax. Thus, if said amorphous micro-crystalline wax be replaced by another amorphous wax, such as petrolatum, the resulting films are quite tacky and are not self-sustaining. It will thus be appreciated that the presence with the polymer, of the specific amorphous micro-crystalline petroleum wax referred to is the critical feature of the invention, since it is due to the presence of this wax that the manufacture of films and coatings is made possible without any particular control of the viscosity of the compositions from which the films and coatings are derived.

It is accordingly an object of my invention to provide compositions of a rubbery polymer of an iso-olefine and an amorphous micro-crystalline highly ductile petroleum wax, which are capable of producing coatings and self-sustaining sheets, which are non-tacky at low temperature and self-sealing at higher temperatures and which possses a high tensile strength.

A further object of my invention are such compositions containing an addition of paraffin wax.

A further object of my invention is a process for producing such compositions.

An additional object are the films and foils derived from such compositions.

Another object is a method of producing said films.

Other and further objects will appear as the description proceeds.

My compositions contain as the essential components a solid rubbery palymer of an iso-olefine, such as those described in U. S. P. 2,203,873 and the aforestated, "amorphous micro-crystalline petroleum wax." The compositions may also contain pariffin wax, as the presence of the same not only permits a decrease in the quantity of the more expensive amorphous wax, but in addition facilitates the manufacture of the films and coatings. It is also desirable to include a cyclicized derivative of rubber where the compositions are to be used in the manufacture of self-sustaining films.

The amounts of the various ingredients may vary rather widely, depending to some extent on the molecular weight of the polymer selected and the use to which the compositions are to be put. Generally speaking, the polymer is present in an amount of from 20 to 40%, the waxes usually constituting the remainder of the composition. When both paraffin wax and the amorphous micro-crystalline wax are present, these are present in the wax mixture in the ratio of 20 to 60% of the amorphous wax to 40 to 80% of the paraffin wax. If a cyclicized rubber derivative is used, it may be present in an amount approaching that of the iso-olefine polymer.

The paraffin wax and the amorphous micro-crystalline wax may be derived, respectively, from the wax distillate and the steam refined cylinder stock fractions of a paraffinic base oil. The paraffin wax is obtained from the wax distillate portion by chilling to low temperatures and pumping through a filter to strain the solidified wax from the oil. This solidified wax is then subjected to further treatment, such as "sweating" to relieve it of entrained oil and filtered through fuller's earth for clarification and whitening to produce a highly crystalline and porous paraffin wax. This paraffin wax may be entirely or substantially entirely relieved of its entrained oil to result in a commercial paraffin. When small amounts of oil are left entrained in the wax the material is termed "scale wax" and is somewhat less brittle than the highly refined paraffin. It is, therefore, to be understood that as used in the specification and claims the term "paraffin wax" may include the highly refined paraffin and so-called "scale waxes" if low in oil content and the "scale wax" may replace all or part of the paraffin in the compounds hereinafter set forth.

The steam refined cylinder stock fraction of the crude oil is the source of petrolatum and the amorphous petroleum wax herein contemplated, which cannot be separated by the use of the filter press for the reason that these sought for products have a crystalline formation of sub-microscopic size. Therefore, to refine this fraction of the oil the material is mixed with light naphtha and gasoline and filtered to the desired color. This mixture is then chilled to sub-zero temperature and separated by running through a suitable device, such as a Sharples centrifuge which separates the solidified jelly-like material from the oil. This jelly-like material is then subjected to re-centrifuging and an amorphous micro-crystalline petroleum wax is thereby separated from the petrolatum after which it may be filtered through fuller's earth to any desired color, the low melting point material being "petrolatum" and the high melting point material being the desired amorphous micro-crystalline highly ductile wax.

The following is a comparative analysis of average commercial specimens of paraffin wax, amorphous micro-crystalline wax and petrolatum which clearly sets forth the contrasting physical characteristics of the materials:

|  | Paraffin wax | Amorphous micro-crystalline wax | Petrolatum |
| --- | --- | --- | --- |
| Penetration at— |  |  |  |
| 32° F., 200 grams, 60 seconds. | 10 | 27 | Too soft. |
| 77° F., 100 grams, 5 seconds. | 16 | 42 | Do. |
| 90° F., 50 grams, 5 seconds. | 16 | 40 | Do. |
| Ductility at 80° F. centimeters. | 0 | 2 | Do. |
| Melting point _____°F__ | 128.2 | 140.8 | 128.8 |

It is, of course, to be understood that the penetration of paraffin wax may range from 10 to 25 and that of amorphous micro-crystalline wax from 25 to 50. It will also be understood that the melting point of paraffin wax may vary from between 120° to 138° F. and that of the amorphous micro-crystalline wax may range from 130° to 160° F.

Microscopic observation of these three materials dissolved in a solvent, a drop of which was placed on a slide and the solvent permitted to evaporate, showed as follows:

Paraffin wax:
    Large clearly defined crystalline structure under low magnification.

Amorphous micro-crystalline wax:
    Under equal magnification, no crystalline structure visible. Under high magnification very fine crystals visible.

Petrolatum:
    No crystalline structure visible either under low or high magnification.

It will, therefore, be understood that the term "amorphous micro-crystalline petroleum wax," as used in the specification and claims herein, refers to the material hereinabove described and which is substantially free from paraffin wax and substantially free from petrolatum. These amorphous micro-crystalline waxes consist generally of the higher members of the paraffin series of hydrocarbons and probably some of the higher olefines. The color may vary from greenish yellow to almost white and in consistency is soft and flexible and more or less tacky. It carries less than 1% ash and volatilizes without any acrid odor, and is considerably less oily in nature than petrolatum.

My compositions are not only superior to known compositions in the respects stated above, but in addition have the advantage that they do not have to be heated and melted before they are applied, but can be sheeted out to self-supporting films on an ordinary even speed two-roll mill, or preferably on a calender, such as those used in the rubber industry. By using a calender for making the films or coating compositions, the process can be continuous, no special heating equipment is necessary, and the process is more economical and easier to control than a process where a strict viscosity control is essential to the production of suitable films or coating compositions.

The coating compositions and self-sustaining films may be used for the purposes suggested in the prior art. Thus the self-sustaining films because of their freedom from tack at ordinary temperatures and their ability to heat-seal at higher temperatures may be employed as thermoplastic adhesives for laminating adhering paper to paper, paper to metal foil, paper or foil to cork and the like. For instance, the films are placed between the objects which it is desired to laminate or adhere and the objects are ironed together with a hot iron. This procedure is particularly useful in the fur industry in re-enforcing cheap furs with a cloth lining while employing said films as the laminating layer. The films or sheets coated with the coating compositions may also be used as non-tacky wrappings for food and similar products.

My invention is further illustrated in the following examples, wherein the parts are by weight. It is to be understood, however, that these examples are illustrative and not limitative.

*Example I*

Parts by weight
Isobutylene polymer (mol. wt. 100,000) _____ 20
Paraffin wax (120–138° F.) _____ 60
Amorphous micro-crystalline wax (130–160° F.) _____ 20

The paraffin and amorphous micro-crystalline waxes are melted together and then slowly added to the polymer which is being worked on a two-roll rubber mill. After the mix is completed, the compound can be sheeted out to a thin self-supporting film.

If preferred for laminating material foil to paper, the above compound can be melted and applied to the paper with a coating machine, and then the foil is adhered with heat and pressure.

Where a self-supporting film of great strength is required as, for instance, in a wrapping film or as a thermoplastic film to be used for heat-sealing, the following is suitable:

Example II

| | Parts by weight |
|---|---|
| Isobutylene polymer (mol. wt. 85,000) | 35 |
| Cyclicized rubber derivative | 35 |
| Paraffin wax (120–138° F.) | 22 |
| Amorphous micro-crystalline wax | 18 |

The rubber derivative and polymer are milled together on a hot rubber mill. This blend is then worked on a rubber mill and to it is added the wax mixture which previously had been melted together and cooled. The above composition can be calendered out to a thin, transparent, flexible and dry feeling film. This film can be used for wrapping foodstuffs by itself, or it can also be calendered onto paper and this, used as a wrapping material, can be heat-sealed and will be water-proof.

The composition of Example II, when made without the amorphous micro-crystalline wax, does not give a good self-sustaining film and cannot be readily calendered.

If desired, pigments or fillers can also be added by first incorporating the pigment or filler into the isobutylene polymer in any conventional manner.

Example III

The procedure is the same as in Example I, except that the polymer, paraffin wax and amorphous micro-crystalline wax are proportioned in the ratio of 30:50:20 parts by weight.

Example IV

The procedure is the same as in Example II, except that the polymer, cyclicized rubber derivative, paraffin wax and amorphous micro-crystalline wax are proportioned in the ratio of 40:25:15:20 parts by weight.

Various modifications of the invention will be apparent to those skilled in the art and I accordingly do not intend to be limited in the patent granted, except as required by the prior art and appended claims.

I claim:

1. Compositions suitable for producing self-sustaining films which are non-tacky at ordinary temperatures, but are capable of heat-sealing at elevated temperatures consisting of between 35 and 40 parts by weight of a polyisobutylene having an average molecular weight above 30000, 25 to 35 parts by weight of a cyclicized rubber, and between 35 parts and 40 parts by weight of a wax including at least 18 parts by weight of an amorphous micro-crystalline, highly ductile petroleum wax having a melting point of 140.8° to 160° F., any remainder being paraffin wax.

2. A composition suitable for producing self-sustaining films which are non-tacky at ordinary temperatures, but are capable of heat sealing at elevated temperatures consisting of 35 parts by weight of polyisobutylene having an average molecular weight of 85000, 35 parts by weight of a cyclicized rubber derivative, 22 parts by weight of a paraffin wax, and 18 parts by weight of an amorphous micro-crystalline, highly ductile petroleum wax having a melting point of 140.8° to 160° F.

3. A composition suitable for producing self-sustaining films which are non-tacky at ordinary temperatures, but are capable of heat sealing at elevated temperatures consisting of 40 parts by weight of polyisobutylene having an average molecular weight of 85000, 25 parts by weight of a cyclicized rubber derivative, 15 parts by weight of a paraffin wax and 20 parts by weight of an amorphous micro-crystalline, highly ductile petroleum wax having a melting point of 140.8° to 160° F.

4. A process for producing compositions suitable for self-sustaining films which are non-tacky at ordinary temperatures, heat-sealing at higher temperatures and of high tensile strength, which process comprises melting 15 to 22 parts by weight of paraffin wax with 18 to 20 parts by weight of an amorphous micro-crystalline, highly ductile petroleum wax having a melting point of 140.8° to 160° F., and blending 35 to 40 parts by weight of the resulting wax mixture by kneading with from 35 to 40 parts by weight of a solid rubbery, substantially saturated, linear polymer of an iso-olefine and from 25 to 35 parts by weight of a cyclicized rubber.

GERRY P. MACK.